(12) United States Patent
Thomas et al.

(10) Patent No.: US 11,514,246 B2
(45) Date of Patent: Nov. 29, 2022

(54) PROVIDING SEMANTIC COMPLETENESS ASSESSMENT WITH MINIMAL DOMAIN-SPECIFIC DATA

(71) Applicant: International Business Machines Corporation, Armonk, NY (US)

(72) Inventors: John J. Thomas, Fishkill, NY (US); Maxime Allard, New York, NY (US); Aleksandr Evgenyevich Petrov, Acton, MA (US); Vinay R. Dandin, San Jose, CA (US); Wanting Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 16/663,754

(22) Filed: Oct. 25, 2019

(65) Prior Publication Data

US 2021/0124801 A1    Apr. 29, 2021

(51) Int. Cl.
| | | |
|---|---|---|
| *G06F 40/30* | (2020.01) | |
| *G06N 3/08* | (2006.01) | |
| *G06N 3/04* | (2006.01) | |

(52) U.S. Cl.
CPC ............. *G06F 40/30* (2020.01); *G06N 3/04* (2013.01); *G06N 3/0445* (2013.01); *G06N 3/0454* (2013.01); *G06N 3/08* (2013.01)

(58) Field of Classification Search
CPC ............ G06F 16/3329; G06F 16/3344; G06F 16/90332; G06F 40/30; G06N 3/04;
(Continued)

(56) References Cited

U.S. PATENT DOCUMENTS

| | | |
|---|---|---|
| 6,542,905 B1 | 4/2003 | Fogel |
| 7,693,705 B1 | 4/2010 | Jamieson |

(Continued)

OTHER PUBLICATIONS

Anonymous, "Method and System for Estimating and Improving Assessments, Surveys and User Testing", ip.com, IP.com No. IPCOM000253166D (2018).

(Continued)

*Primary Examiner* — Eric Yen
(74) *Attorney, Agent, or Firm* — Michael A. Petrocelli (57) ABSTRACT

A question-and-answer system directed to a specific domain optimally utilizes reference documents that are semantically complete for that domain. Semantic completeness of a document is assessed using quality control questions (provided by subject matter experts) applied to the Q&A system followed by analysis of the proposed answers. That analysis is carried out using a cogency module having a feedforward neural network which receives metadata features of the document such as document ownership, document priority, and document type. A domain-optimized corpus for the Q&A system is built by so assessing multiple documents in a document collection, and adding each reference document that is reported as being semantically complete to the domain-optimized corpus. Thereafter, the deep learning question-and-answer system can receive a natural language query from a user, find a responsive answer in the documents while applying the domain-optimized corpus, and provide that answer to the user.

20 Claims, 5 Drawing Sheets

(58) Field of Classification Search
CPC ...... G06N 3/0445; G06N 3/0454; G06N 3/08; G10L 15/22

See application file for complete search history.

(56) References Cited

U.S. PATENT DOCUMENTS

| | | | |
|---|---|---|---|
| 8,341,173 | B2 | 12/2012 | Li et al. |
| 8,601,030 | B2 | 12/2013 | Bagchi et al. |
| 9,002,773 | B2 | 4/2015 | Bagchi et al. |
| 10,162,885 | B2 | 12/2018 | Rozsa et al. |
| 10,229,188 | B2 | 3/2019 | Cortis et al. |
| 2003/0236659 | A1* | 12/2003 | Castellanos ........... G06F 40/211 704/4 |
| 2004/0054660 | A1* | 3/2004 | McCormick ..... G05B 19/41875 |
| 2004/0181390 | A1* | 9/2004 | Manson ................. G06F 40/55 704/2 |
| 2006/0288285 | A1* | 12/2006 | Lai ....................... G06F 40/226 715/708 |
| 2009/0327172 | A1* | 12/2009 | Liu ........................ G06N 20/00 706/12 |
| 2012/0011141 | A1* | 1/2012 | Park ................. G06F 16/24522 707/E17.069 |
| 2018/0365229 | A1* | 12/2018 | Buhrmann ............ G06F 40/247 |
| 2020/0012697 | A1* | 1/2020 | Fan ..................... G06F 16/9535 |
| 2022/0108076 | A1* | 4/2022 | Bae ...................... G06K 9/6256 |

OTHER PUBLICATIONS

Anonymous, "Method and System for Enabling Semantic Grounded Visual Question Answering", ip.com, IP.com No. IPCOM000258157D (2019).

Daga, Pranjal, et al., "Domain-Specific Language Model Using Domain Literature and Experts' Spoken Language", ip.com, IP.com No. IPCOM000251170D (2017).

Khashabi, Daniel, et al., "Question Answering as Global Reasoning over Semantic Abstractions", Ass'n. For The Advancement Of Artificial Intelligence, 32nd AAAI Conf, on Artificial Intelligence (2018).

Seo, Minjoon, et al., "Bidirectional Attention Flow for Machine Comprehension", 5th Int'l. Conf. on Learning Representations (2016).

Simsek, Umutcan, et al., "Domain-Specific Semantic Validation of Schema.org Annotations", Springer Verlag, Chapter in Lecture Notes in Computer Science (2018) (2018).

SQuAD, "The Stanford Question Answering Dataset" [online], retrieved on Sep. 30, 2019, from the Internet URL: https://rajpurkar.github.io/SQuAD-explorer/ (2018).

Sun, Huan, et al., "Open Domain Question Answering via Semantic Enrichment", Proc. Int'l. Conf. on World Wide Web, pp. 1045-1055 (2015).

Tatu, Marta, et al., "A Semantic Question Answering Framework for Large Data Sets", Open Journal of Semantic Web, v. 3, n. 1, pp. 16-31 (2016).

Zhu, Lingkai, "SemDQ: A Semantic Framework for Data Quality Assessment", University of Waterloo, Ontario, Canada (2014).

* cited by examiner

PROVIDING SEMANTIC COMPLETENESS ASSESSMENT WITH MINIMAL DOMAIN-SPECIFIC DATA

BACKGROUND OF THE INVENTION

Field of the Invention

The present invention generally relates to cognitive systems (artificial intelligence or deep learning), and more particularly to a method of assessing the semantic completeness of a document to be used as a reference by a cognitive system.

Description of the Related Art

A cognitive system (sometimes referred to as deep learning, deep thought, or deep question answering) is a form of artificial intelligence that uses machine learning and problem solving. Cognitive systems often employ neural networks although alternative designs exist. The neural network may be of various types. A feedforward neural network is an artificial neural network wherein connections between the units do not form a cycle. The feedforward neural network was the first and simplest type of artificial neural network devised. In this network, the information moves in only one direction, forward, from the input nodes, through the hidden nodes (if any) and to the output nodes. There are no cycles or loops in the network. As such, it is different from recurrent neural networks. A recurrent neural network is a class of artificial neural network where connections between units form a directed cycle. This creates an internal state of the network which allows it to exhibit dynamic temporal behavior. Unlike feedforward neural networks, recurrent neural networks can use their internal memory to process arbitrary sequences of inputs. A convolution neural network is a specific type of feed-forward neural network based on animal visual perception, and so is particularly useful in processing image data. Convolutional neural networks are similar to ordinary neural networks but are made up of neurons that have learnable weights and biases.

There are many alternatives to the use of neural networks for machine learning, such as a support vector machine (SVM). An SVM basically constructs a multidimensional mathematical space based on training examples, and provides a boundary in that space that allows for binary classification of an input, e.g., as a "good" answer versus a "bad" answer. Another approach involves Bayesian networks which represent a set of variables with a directed acyclic graph. The network is then used to compute probabilistic relationships between the variables. A cognitive system is not limited to use of a single approach, i.e., it can incorporate any number of these machine learning algorithms.

A modern implementation of artificial intelligence is the IBM Watson™ cognitive technology, which applies advanced natural language processing, information retrieval, knowledge representation, automated reasoning, and machine learning technologies to the field of open domain question answering. Such cognitive systems can rely on existing documents (corpora) and analyze them in various ways in order to extract answers relevant to a query, such as person, location, organization, and particular objects, or identify positive and negative sentiment. Different techniques can be used to analyze natural language, identify sources, find and generate hypotheses, find and score evidence, and merge and rank hypotheses. Models for scoring and ranking the answer can be trained on the basis of large sets of question (input) and answer (output) pairs (this training dataset is different from the reference corpora). The more algorithms that find the same answer independently, the more likely that answer is correct, resulting in an overall score or confidence level.

As part of this effort, many systems employ some form of natural language processing. Natural language processing (NLP) is a field of computer science, artificial intelligence, and linguistics concerned with the interactions between computers and human (natural) languages. Many challenges in NLP involve natural language understanding, that is, enabling computers to derive meaning from human or natural language input, and others involve natural language generation allowing computers to respond in a manner familiar to a user. For example, a non-technical person may input a natural language question to a computer system, and the system intelligence can provide a natural language answer which the user can hopefully understand (and is correct).

SUMMARY OF THE INVENTION

The present invention in at least one embodiment is generally directed to a method of assessing semantic completeness of a reference document for a deep learning question-and-answer system adapted to a specific domain by receiving a plurality of quality control questions whose context relates to the specific domain, applying a particular one of the quality control questions to the deep learning question-and-answer system to find a quality control answer in the reference document, determining that the quality control answer is either valid or invalid, and reporting the reference document as correspondingly being either semantically complete for the specific domain when the quality control answer is valid or semantically incomplete for the specific domain when the quality control answer is invalid. In the illustrative implementation, the reference document has a plurality of metadata features, and the determination is carried out using a cogency module having a feedforward neural network which receives an output of the deep learning question-and-answer system as a first input and receives the metadata features as a second input, the feedforward neural network having a single-value output that provides a yes/no indication of validity. The feedforward network includes a first dense layer which receives the metadata features as inputs, a concatenation block that concatenates an output of the first dense layer with the output of the deep learning question-and-answer system, a second dense layer which receives the concatenated outputs as inputs, and a third dense layer having a sigmoid activation function which receives outputs of the second dense layer as inputs and generates the single-value output. The output of the deep learning question-and-answer system includes a dense layer output and a long short-term memory layer output, the dense layer output being indicative of a tentative start location within the reference document for the quality control answer and the long short-term memory layer output being indicative of a tentative end location within the reference document for the quality control answer, and the feedforward neural network further includes a fourth dense layer which receives the dense layer output and the output of the first dense layer as inputs, an output of the fourth dense layer being merged with the dense layer output to provide a most likely start location within the reference document for the quality control answer, and a fifth dense layer which receives the long short-term memory layer output and the output of the first dense layer as inputs, an output of the fifth dense layer being merged with the long short-term memory layer output to provide a most likely end location within the reference document for the quality control answer. The fourth dense layer can use a first forget gate to adjust first weights of the output of the first dense layer which are used in a first weighted averaging to merge with the dense layer output, and the fifth dense layer can use a second forget gate to adjust second weights of the output of the first dense layer which are used in a second weighted averaging to merge with the long short-term memory layer output. A domain-optimized corpus for the deep learning question-and-answer system can be built by repeating the applying, the determining and the reporting for each of the reference documents in a document collection, and adding each reference document that is reported as being semantically complete to the domain-optimized corpus. Thereafter, the deep learning question-and-answer system can receive a natural language query from a user, find a responsive answer in the reference document while applying the domain-optimized corpus, and provide the responsive answer to the user.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

Various mechanisms including question-and-answer (Q&A) systems exist to automatically answer questions posed by humans in a natural language. However, these fall short of being able to perform completeness checks in various domains. For example, financial institutions are looking to assess the completeness of answers around risk in financial operations. Current Q&A systems are not able to provide the level of completeness that is desired by the industry. The question "Where is the control performed?" when asked in the context of financial operations should relate to a business group/unit/company and not to a geographical location. Conventional Q&A systems make no distinction between the former and the latter. A reference document might state "The internal audit team in London is reviewing the control", in which case the Q&A system is likely to return "London" to the foregoing question, instead of the needed answer "the internal audit team".

It would, therefore, be desirable to devise a method of assessing semantic completeness of documents to be used as reference corpora for specific domains. It would be further advantageous if the method could allow a Q&A system to provide contextually correct answers with minimal training data requirements. The present invention in its various embodiments achieves these and other advantages by leveraging domain-specific features about a text document (metadata) and the text itself to assess the completeness of this text document. Additionally, the cogency module used in the present invention is able to verify that a given answer from the Q&A system is cogent for the given domain, since the answers might be correct for some broader sense of the question but a very specific answer is needed for each particular domain. Subject matter experts (SMEs) explicitly establish the basis for the quality assessments by providing domain-specific questions. The cogency module ensures that the Q&A system captures the right type of answer by learning from historical data and SME annotated data what the answer should be related to, and adapts to the specific domain to check for the needed answer. This approach allows the Q&A system to be trained on relatively little data.

Figure 1:
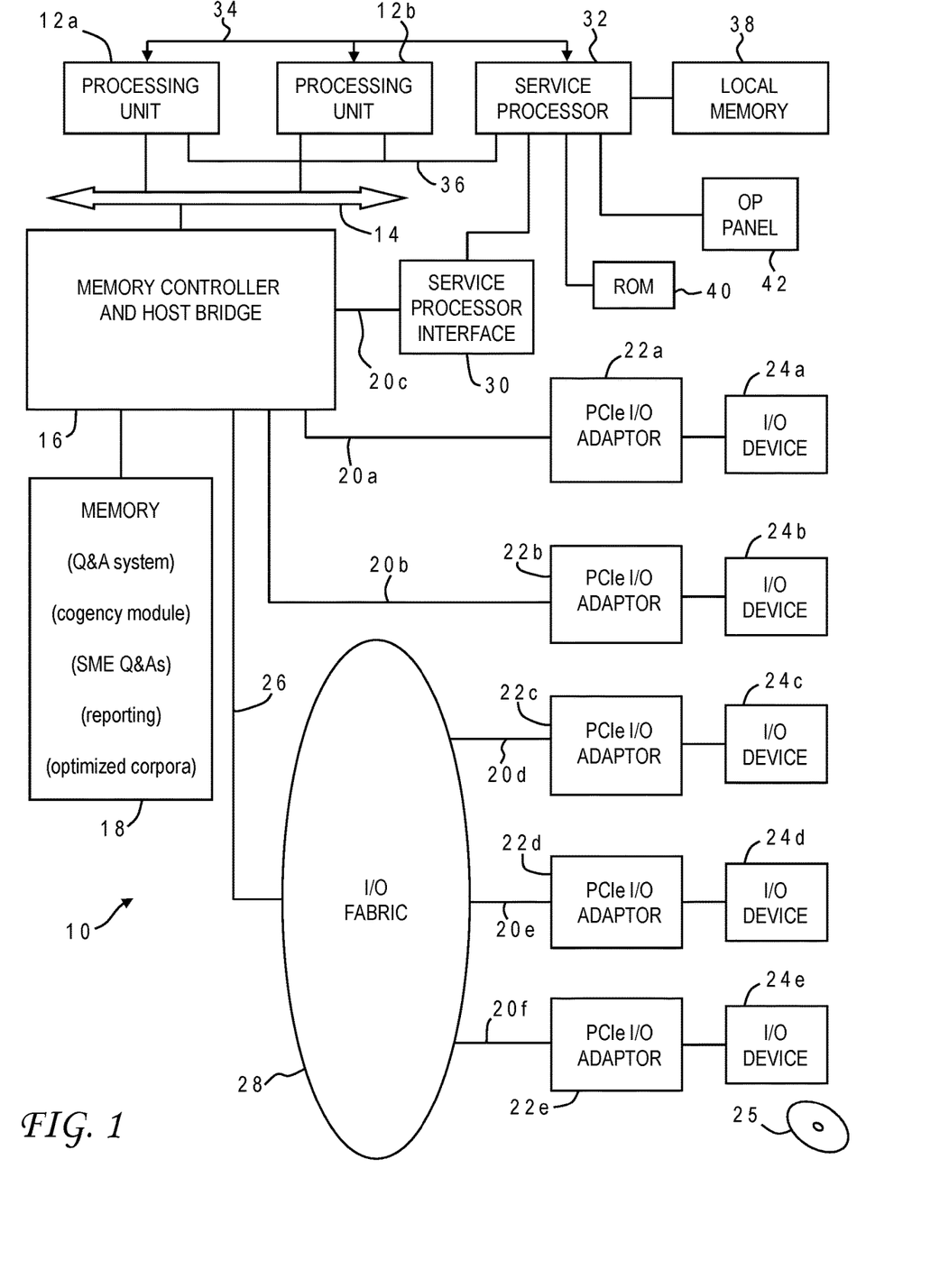
FIG. 1 is a block diagram of a computer system programmed to carry out semantic completeness assessment of documents and cogency checking for a question-and-answer system in accordance with one implementation of the present invention.

With reference now to the figures, and in particular with reference to FIG. 1, there is depicted one embodiment 10 of a computer system in which the present invention may be implemented to carry out document assessment for semantic completeness as well as cogency checking for a question-and-answer system. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention such as the Q&A system, the cogency module, SME-supplied questions for completeness assessment, a module that reports on the completeness checking, and optimized corpora to be used with the Q&A system.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the semantic completeness assessment application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a semantic completeness assessment that uses a novel cogency module to enhance a Q&A system. Accordingly, a program embodying the invention may additionally include conventional aspects of various deep question answering tools, and these details will become apparent to those skilled in the art upon reference to this disclosure.

Figure 2:
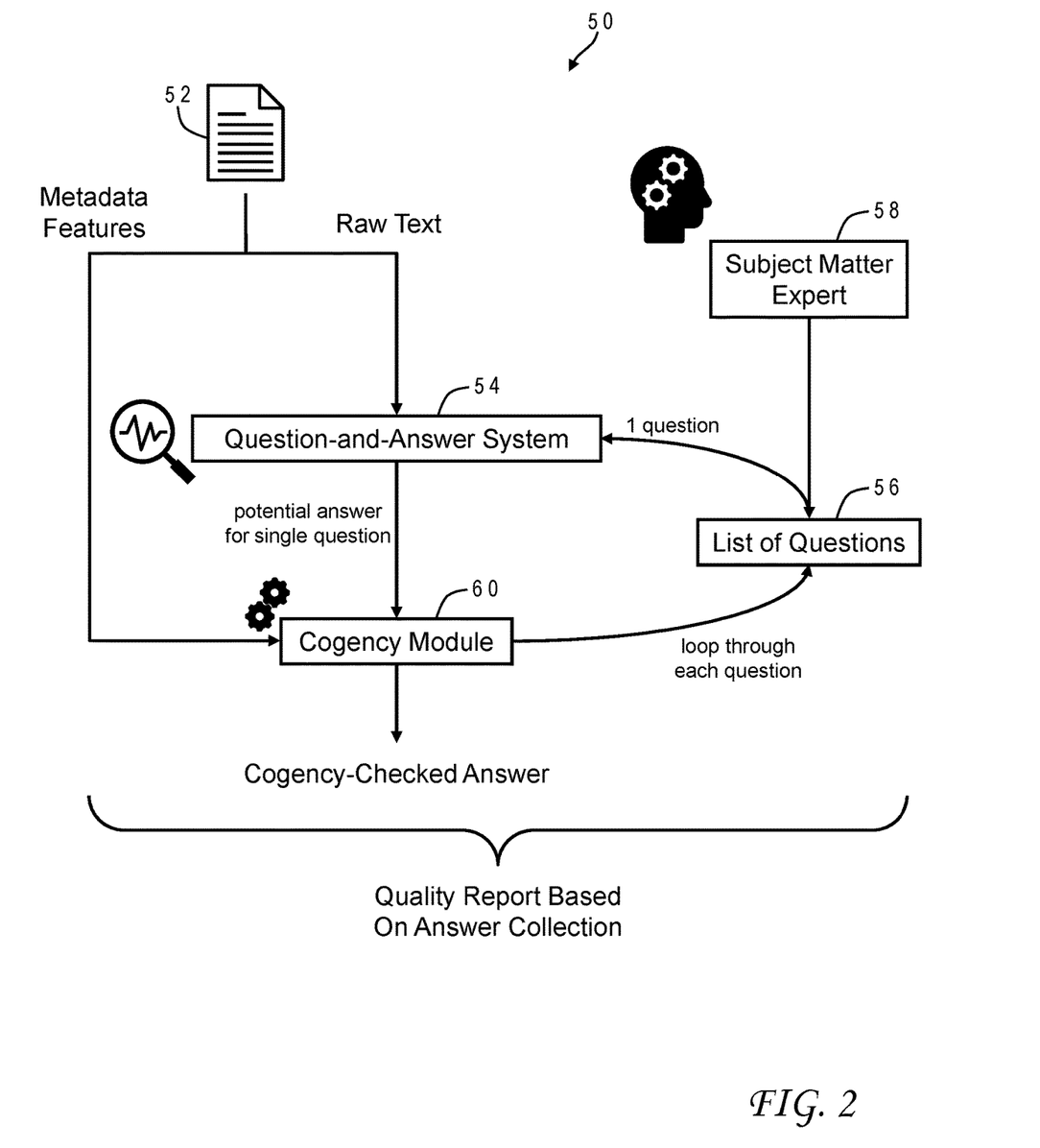
FIG. 2 is a pictorial diagram illustrating how a document is checked for semantic completeness using subject-matter expert questions in accordance with one implementation of the present invention.

Referring now to FIG. 2, there is depicted a high-level diagram illustrating one implementation of an assessment environment 50 for determining whether a document 52 is semantically sufficient such that it can be used for an automated machine comprehension model 54 (i.e., a Q&A system) adapted to a specific domain. The document can be any kind of file that contains textual statements. The Q&A system is pre-trained on a multiplicity of publicly available data such as the Stanford question answering dataset (see Internet URL https://rajpurkar.github.io/SQuAD-explorer/). Raw text from document 52 is fed to Q&A system 54 as reference material (a mini-corpus) from which candidate answers are to be extracted. In this implementation Q&A system 54 is generally conventional. A list of questions 56 is provided to Q&A system 54 by a subject matter expert (SME) 58; answers are also provided by the SME for the questions, only for the documents used in the fine-tuning process. The questions 56 are specifically tailored to the particular domain of Q&A system 54 by SME 58. The exact questions depend upon the domain but are intended to reveal semantic weaknesses in the document, i.e., possible contextual ambiguity. For the application where a user is interested in examining risk associated with financial operations, the following questions are exemplary:

"Who performs the control?"
"What steps are performed?"
"When or how frequently is the control performed?"
"Where is the control performed?"
"How is the control performed?"

These quality control questions 56 are presented one at a time to Q&A system 54 for processing, which generates a potential answer. The answers to each one of these domain-specific questions should be such that they show the completeness for individual elements of the assessment. If every question has a cogent answer, this means that the document passes the completeness assessment. The potential answer from Q&A system 54 can simply be compared to known answers for this question, but in the illustrative implementation the present invention introduces a novel cogency module 60 that has the purpose of verifying the cogency of the answer given the domain-specific questions. Cogency module 60 is added to the base Q&A system 54 to carry out question answering as described further below in conjunction with FIG. 3 (the original training of Q&A system 54 is done without the cogency module turned on). Cogency module 60 uses metadata features extracted from document 52 to verify the answer. After having issued the domain-specific questions, the cogency module can be fine-tuned on a few labeled examples that were answered by SMEs. These answers are the answers to these domain-specific questions based on a specific document. If the answer is not present, the answer is marked as absent.

The metadata features extracted from the document can vary considerably depending on design considerations. Exemplary metadata features include, without limitation, the document ownership, the priority of the document, and the type of document. Ownership of the document could be the business unit or other entity that is responsible for creating, handling or receiving the given text document. The priority of a document could be the importance of processing priorities for certain documents, e.g., "high importance", "medium importance", or "low importance". The type of a document could refer to what that text document represents (documentation, news article, complaint, control, etc.). Other metadata features might include file format or location, geographic origin, title or subject, security or administrative restrictions, other file attributes, or tags. The number of meta-data features is not limited. Everything that is available for a document in the specific domain can be used. These features are common across all the documents going into this process.

The metadata features are inputs to a feedforward neural network of cogency module 60. The output of this neural network provides the span of the answer to our question, that is, the beginning and end locations of the text forming the answer inside the document if cogency module 60 has confirmed the answer from the Q&A system. It might often happen that the question is answered somewhat correctly semantically but not in a way that corresponds to the quality criteria defined by the SME. Therefore cogency module 60 is checking the validity of this answer by putting the answer through the module with additional features coming from the raw document. If our module analysis concludes that either the answer is not good enough or there is no answer, then it will output a token indicating no valid answer. If cogency module 60 outputs a valid answer then that question has been answered correctly and will count toward the quality check.

This quality checking occurs for each question in the list 56. A quality report module uses the outputs of the Q&A system with the cogency module for all the questions to return the recommendation for the quality assessment for this document and for the reasons of any failures in the quality assessment, which together constitute the outcome of the document processing. The assessment is pass/fail, i.e., a document is considered either sufficiently complete or is incomplete. In some implementations a document is considered incomplete even when only one question is not answered validly; however, other implementations can set a threshold like 80% of the answers to the SME questions needing to be answered validly for the completeness of a document to be verified.

While the cogency module is described in this implementation as being separate from the Q&A system, it could be integrated into an enhanced Q&A system in other implementations, i.e., considered a part of that Q&A system.

Figure 3:
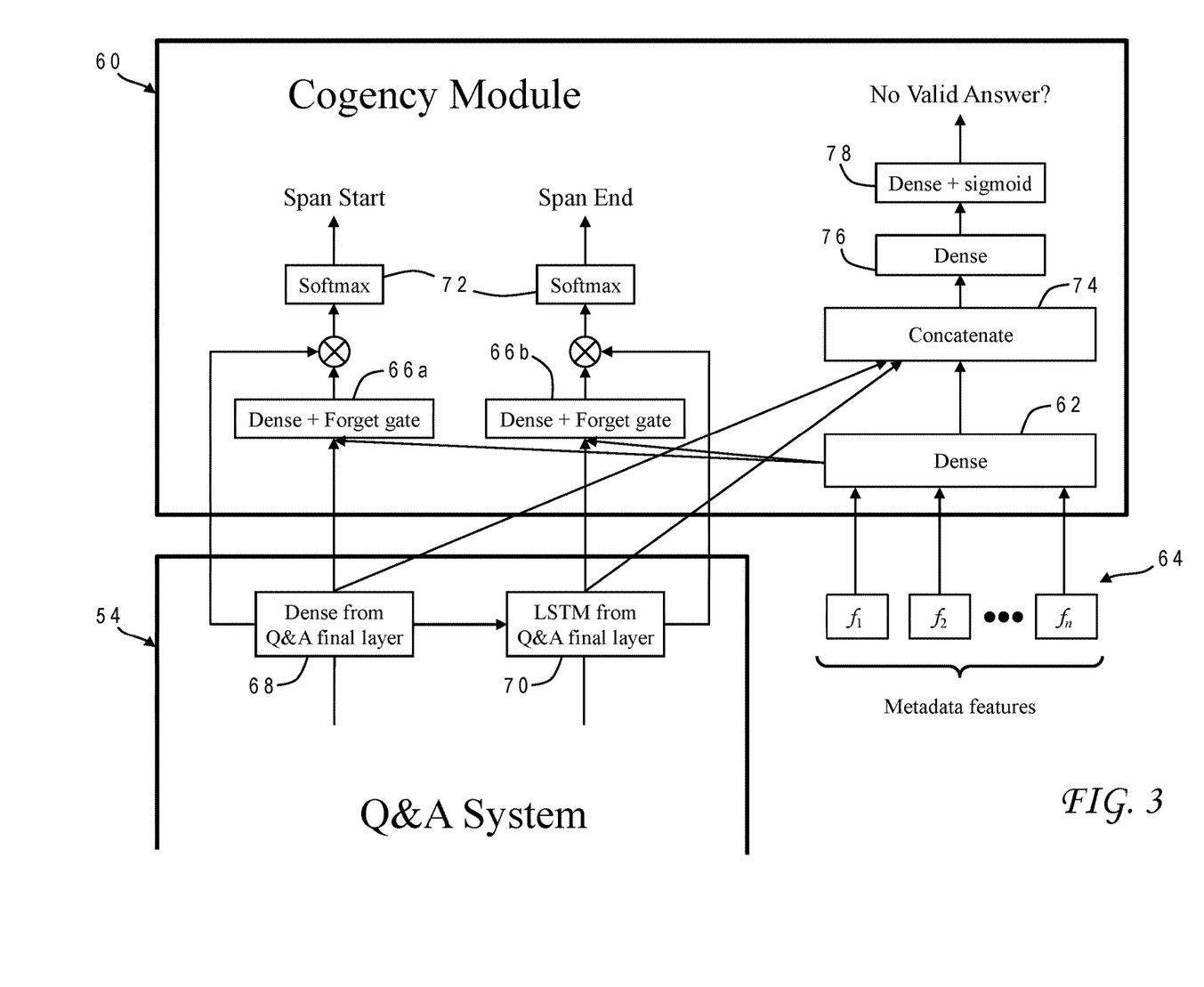
FIG. 3 is a block diagram of a cogency module used to assess the semantic completeness of an answer from a question-and-answer system in accordance with one implementation of the present invention.

FIG. 3 shows cogency module 60 in more detail. As noted above, cogency module has a neural network architecture. A dense layer 62 receives inputs from the document metadata features 64. Dense layers are known to those skilled in the art of neural networks. A dense layer is just a regular layer of neurons in a neural network. Each neuron receives input from all the neurons in the previous layer, thus densely connected. The layer has a weight matrix, a bias vector, and the activations of the previous layer. The metadata features are mapped to the fixed size of dense layer 62. While the number of metadata features could vary across different implementations of the present invention, for a given implementation the number of metadata features is constant over all documents, although for certain documents some of the values could be void.

The output of dense layer 62 is fed into two other dense neural layers 66a, 66b each having forget gates. Dense layers 66a, 66b also receive inputs from the final (output) layer of Q&A system 54. That final layer includes a dense layer 68 and a long short-term memory (LSTM) layer 56. LSTM cells are also known in the art of neural networks. An LSTM network is a kind of recurrent neural network. Cells in an LSTM network remember values over arbitrary time intervals and their gates regulate the flow of information into and out of the cell. Together, the outputs of dense layer 68 and LSTM layer 70 form the output of Q&A system 54, providing an indication of where in the reference corpora the answer is to be found, i.e., the span. The span of an answer represents the sequential position of the answer words inside the text. The size of dense layer 62 is the same size as the output of the Q&A system (the combined size of the dense and the LSTM blocks 68, 70 in the final layer).

Dense neural layers 66a, 66b are similar in construction but their respective outputs refer to the start of the span and the end of the span, i.e., the position of the first word of the candidate answer in the text and the position of the last word of the candidate answer. The weights of the output of dense layer 62 are merged with the output of the Q&A system. The merging happens through a weighted average that is controlled by the forget gates. This simple gate helps the model to decide whether to take into account the "old" knowledge from the pre-trained Q&A system or leverage more of the new information provided by the metadata. In this manner, cogency module 60 can efficiently use the "old" knowledge if it thinks that knowledge is more reliable than the provided metadata. Cogency module 60 learns how much to "forget" its previous knowledge during a fine-tuning procedure, and how to adjust the given span beginning/ending of the answer given the metadata. Fine tuning lies in the adjustment of all the weights inside cogency module 60. Forget gates have specific weights contributed to them that are then adjusted. The same applies to the weights in the layers that predict the span. The adjustments are done with an optimization algorithm. The optimization algorithm used here is the Adam optimizer. A loss function is used to optimize the neural network by reducing (e.g., minimizing) the loss function of the system. Optimization is used to find the parameters of the system that reduce (e.g., minimize) value of the loss function, which is indicative of how well the system approximates a solution during training or fine-tuning. The loss function is comparing how close the answers from the system are from the answers given by the SME and then the weights of the neural network are adjusted to improve the answer given by the system.

The merged outputs of dense layers 66a, 66b pass through respective softmax constraints 72. The softmax function is also known in the arts of computer science and mathematics, and assigns decimal probabilities to each class in a multi-class problem. Those decimal probabilities add up to 1. The outputs of these neural layers are accordingly the probabilities of each word position in the text being the start/end word of the answer. To get the span that is most likely correct, the position with the highest probability is chosen and considered as "best" start/end, thereby identifying the answer generated by enhanced cogency.

In addition to this generation of a most likely answer, cogency module 60 has a separate datapath to provide an indication of whether that answer is considered valid within the semantic context of the domain of the Q&A system. The output of dense layer 62 is fed to a concatenation block 74 which also receives the output of the final layer of Q&A system 54. Concatenation block 74 acts as an input for another dense layer 76 of the same size, thus taking into account the output of the Q&A system and the output of the metadata layer to decide whether or not the proposed answer is cogent. Dense layer 76 feeds another dense layer 78 having a sigmoid activation function. The sigmoid function is again known in the art, and outputs a single value between zero and one. This value is used to determine whether the proposed answer is valid (a yes/no indication). The threshold cutoff for validity is set by the designer; an exemplary value is 0.5, i.e., an output that is less than 0.5 is considered invalid, but an output of 0.5 or more is considered valid. Weights for the dense layers 76, 78 are again set through a supervised learning process. Those skilled in the art will appreciate that cogency module 60 thus has a training phrase and an inference phase. Training is performed in a manner similar to training of a Q&A system. Once trained, cogency module 60 is used to judge the semantic fitness of any proposed answer from Q&A system 54 given the desired domain.

Figure 4:
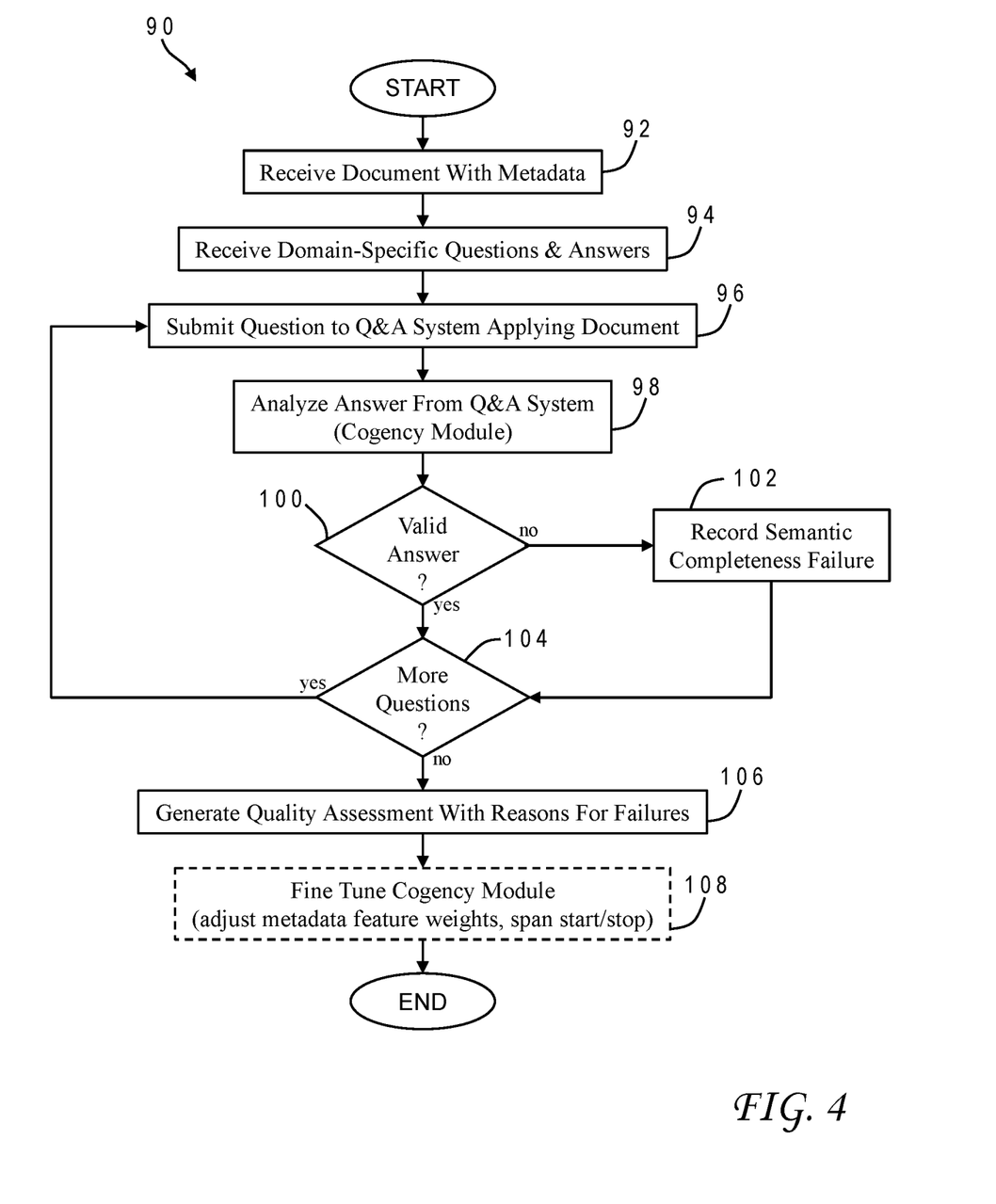
FIG. 4 is a chart illustrating the logical flow for a semantic completeness assessment in accordance with one implementation of the present invention.

The present invention may be further understood with reference to the chart of FIG. 4 which illustrates the logical flow for a semantic completeness assessment process 90 in accordance with one implementation of the present invention. Process 90 may be carried out on any suitable computing device, such as computer system 10 of FIG. 1. Process 90 begins by receiving a document proposed for use as reference material for a Q&A system, along with metadata associated with the document (92). Quality control questions (and answers) are also received that relate to the specific domain of the Q&A system (94). The quality control questions can be curated by a subject matter expert or in any other convenient way. The first question is then submitted to the Q&A system, applying the document (96). The answer from the Q&A system is analyzed by the cogency module (98). If it is not semantically valid for the subject domain (100), a note of the failure and reasons therefore are recorded (102). If there are more questions (104), the process returns iteratively to the question submission (96). Once all of the questions have been answered and the answers analyzed, a quality assessment is generated for the document (106). If the cogency module is still be trained, it can be fine tuned at this point based on the current assessment results (108), and the assessment process ends.

Figure 5:
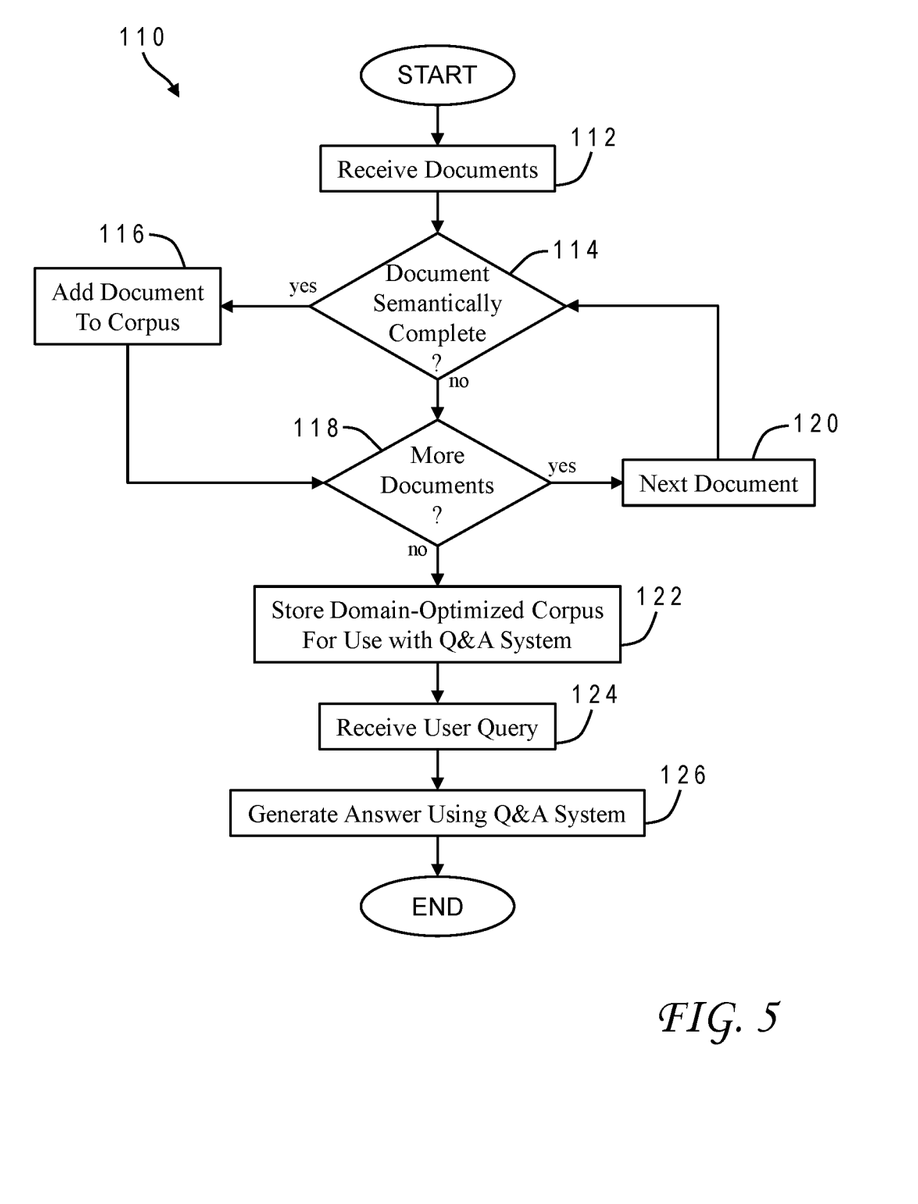
FIG. 5 is a chart illustrating the logical flow for a procedure to build a corpus for a question-and-answer system and use that corpus to provide an answer to a user query in accordance with one implementation of the present invention.

One advantage of the present invention is the ability to build a reference corpus for a Q&A system that is optimized for the particular domain at hand. This optimization in turn allows the Q&A system to be highly accurate even when trained with minimal domain-specific data. The present invention thus represents a significant improvement to the technical field of computers, in particular, cognitive systems. FIG. 5 shows another chart for the logical flow of a process 110 for building an optimized corpus and using it with the Q&A system. Process 110 may again be carried out on any convenience computing device such as computer system 10, and begins by receiving a collection of documents that are proposed for use in creating the domain-specific corpus (112). The documents may be of varying types; all that is required is that they all have text in the same (natural) language for which the Q&A system was devised. A check is made to see if a document is semantically complete (114). If so, that document is added to the corpus for the Q&A system (116). If there are more documents (118), the next document in the collection is selected (120) and the process loops at the completeness check (114). The same set of SME questions can be applied to each of the different documents. Once all of the documents in the collection have been processed, the corpus has become domain-optimized and can be stored for use with the Q&A system (122). Thereafter, a user can submit a natural language query to the Q&A system via any appropriate user interface (124). The Q&A system, using the domain-optimized corpus as reference, then generates a responsive answer and provides that answer to the user (126).

The completeness checks for reference documents become particularly relevant in many specific applications. In the financial operations application, it is critical for companies to be able to provide regulatory compliance in a wide variety of settings. For example, the Sarbanes-Oxley Act was designed to protect shareholders and the general public from accounting errors and fraudulent practices in enterprises, and to improve the accuracy of corporate disclosures. The domain-optimized corpora of the present invention are very useful for such regulatory controls and risks where the controls need to be complete. The present invention in its various embodiments thus offers a line of security in the creation of such controls, effectively addressing challenges for largest and most advanced customers. AI team engagements frequently include analytics on large corpora of documents, ranging from processing call center transcripts, to large volumes of text on complaints, controls, issues, etc. Most enterprises are looking to apply advanced techniques to assess the compliance with regulatory requirements and to streamline internal operations involving their text documents. The ability to control the quality of documents for internal operations of the customers is a key differentiator of the present invention. Existing approaches face a major challenge—high levels of manual labor are involved in getting qualitatively good text documents that serve different purposes (e.g. controls to manage risk and operations).

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described with particular reference to financial operations and risk control, it is not so limited. In the healthcare industry this system could help to control the completeness of the free-text parts in medical EHR (electronic health records). This would systematically help the user to create a complete record that can then be effectively used by doctors or other health services. In the customer-service industry this system could help to control the completeness of the agent notes given customer service, customer satisfaction. This assures that the user will create a complete note given the responses from the customers. It is therefore contemplated that such modifications can be made without departing from the spirit or scope of the present invention as defined in the appended claims.

What is claimed is:

1. A method of assessing semantic completeness of a reference document for a deep learning question-and-answer system adapted to a specific domain comprising:

receiving a plurality of quality control questions whose context relates to the specific domain;

applying a particular one of the quality control questions to the deep learning question-and-answer system to find a quality control answer in the reference document;

determining that the quality control answer is either valid or invalid; and reporting the reference document as correspondingly being either semantically complete for the specific domain when the quality control answer is valid or semantically incomplete for the specific domain when the quality control answer is invalid.

2. The method of claim 1 wherein the reference document has a plurality of metadata features, and said determining is carried out using a cogency module having a feedforward neural network which receives an output of the deep learning question-and-answer system as a first input and receives the metadata features as a second input, the feedforward neural network having a single-value output that provides a yes/no indication of validity.

3. The method of claim 2 wherein the feedforward network includes:
  a first dense layer which receives the metadata features as inputs;
  a concatenation block that concatenates an output of the first dense layer with the output of the deep learning question-and-answer system;
  a second dense layer which receives the concatenated outputs as inputs; and
  a third dense layer having a sigmoid activation function which receives outputs of the second dense layer as inputs and generates the single-value output.

4. The method of claim 3 wherein the output of the deep learning question-and-answer system includes a dense layer output and a long short-term memory layer output, the dense layer output being indicative of a tentative start location within the reference document for the quality control answer and the long short-term memory layer output being indicative of a tentative end location within the reference document for the quality control answer, and the feedforward neural network further includes:
  a fourth dense layer which receives the dense layer output and the output of the first dense layer as inputs, an output of the fourth dense layer being merged with the dense layer output to provide a most likely start location within the reference document for the quality control answer; and
  a fifth dense layer which receives the long short-term memory layer output and the output of the first dense layer as inputs, an output of the fifth dense layer being merged with the long short-term memory layer output to provide a most likely end location within the reference document for the quality control answer.

5. The method of claim 4 wherein the fourth dense layer uses a first forget gate to adjust first weights of the output of the first dense layer which are used in a first weighted averaging to merge with the dense layer output, and the fifth dense layer uses a second forget gate to adjust second weights of the output of the first dense layer which are used in a second weighted averaging to merge with the long short-term memory layer output.

6. The method of claim 1 wherein the reference document is one of a plurality of reference documents in a document collection, and further comprising:
  repeating the applying, the determining and the reporting for each of the reference documents in the document collection; and
  adding each reference document that is reported as being semantically complete to a domain-optimized corpus for the deep learning question-and-answer system.

7. The method of claim 6 further comprising:
receiving a natural language query from a user;
finding a responsive answer to the query using the deep learning question-and-answer system applying the domain-optimized corpus; and
providing the responsive answer to the user.

8. A computer program product comprising:
a computer readable storage medium; and
program instructions residing in said storage medium, where execution of the program instructions using a computer causes the computer to perform steps of a method for assessing semantic completeness of a reference document for a deep learning question-and-answer system adapted to a specific domain, the method comprising the steps of: receiving a plurality of quality control questions whose context relates to the specific domain, applying a particular one of the quality control questions to the deep learning question-and-answer system to find a quality control answer in the reference document, determining that the quality control answer is either valid or invalid, and reporting the reference document as correspondingly being either semantically complete for the specific domain when the quality control answer is valid or semantically incomplete for the specific domain when the quality control answer is invalid.

9. The computer program product of claim 8 wherein the reference document has a plurality of metadata features, and the determining is carried out using a cogency module having a feedforward neural network which receives an output of the deep learning question-and-answer system as a first input and receives the metadata features as a second input, the feedforward neural network having a single-value output that provides a yes/no indication of validity.

10. The computer program product of claim 9 wherein the feedforward network includes:
  a first dense layer which receives the metadata features as inputs;
  a concatenation block that concatenates an output of the first dense layer with the output of the deep learning question-and-answer system;
  a second dense layer which receives the concatenated outputs as inputs; and
  a third dense layer having a sigmoid activation function which receives outputs of the second dense layer as inputs and generates the single-value output.

11. The computer program product of claim 10 wherein the output of the deep learning question-and-answer system includes a dense layer output and a long short-term memory layer output, the dense layer output being indicative of a tentative start location within the reference document for the quality control answer and the long short-term memory layer output being indicative of a tentative end location within the reference document for the quality control answer, and the feedforward neural network further includes:
  a fourth dense layer which receives the dense layer output and the output of the first dense layer as inputs, an output of the fourth dense layer being merged with the dense layer output to provide a most likely start location within the reference document for the quality control answer; and
  a fifth dense layer which receives the long short-term memory layer output and the output of the first dense layer as inputs, an output of the fifth dense layer being merged with the long short-term memory layer output to provide a most likely end location within the reference document for the quality control answer.

12. The computer program product of claim 11 wherein the fourth dense layer uses a first forget gate to adjust first weights of the output of the first dense layer which are used in a first weighted averaging to merge with the dense layer output, and the fifth dense layer uses a second forget gate to adjust second weights of the output of the first dense layer which are used in a second weighted averaging to merge with the long short-term memory layer output.

13. The computer program product of claim 8 wherein the reference document is one of a plurality of reference documents in a document collection, and the program instructions further cause the computer to perform the steps of repeating the applying, the determining and the reporting for each of the reference documents in the document collection, and adding each reference document that is reported as being semantically complete to a domain-optimized corpus for the deep learning question-and-answer system.

14. The computer program product of claim 13 wherein the program instructions further cause the computer to perform the steps of receiving a natural language query from a user, finding a responsive answer to the query using the deep learning question-and-answer system applying the domain-optimized corpus, and providing the responsive answer to the user.

15. A computer system comprising:
one or more processors which process program instructions;
a memory device connected to said one or more processors; and
program instructions residing in said memory device, said program instructions when implemented by the one or more processors, cause the computer system to perform steps of a method for assessing semantic completeness of a reference document for a deep learning question-and-answer system adapted to a specific domain, the method comprising the steps of: receiving a plurality of quality control questions whose context relates to the specific domain, applying a particular one of the quality control questions to the deep learning question-and-answer system to find a quality control answer in the reference document, determining that the quality control answer is either valid or invalid, and reporting the reference document as correspondingly being either semantically complete for the specific domain when the quality control answer is valid or semantically incomplete for the specific domain when the quality control answer is invalid.

16. The computer system of claim 15 wherein the reference document has a plurality of metadata features, and the step of determining is carried out using a cogency module having a feedforward neural network which receives an output of the deep learning question-and-answer system as a first input and receives the metadata features as a second input, the feedforward neural network having a single-value output that provides a yes/no indication of validity.

17. The computer system of claim 16 wherein the feedforward network includes:
a first dense layer which receives the metadata features as inputs;
a concatenation block that concatenates an output of the first dense layer with the output of the deep learning question-and-answer system;
a second dense layer which receives the concatenated outputs as inputs; and
a third dense layer having a sigmoid activation function which receives outputs of the second dense layer as inputs and generates the single-value output.

18. The computer system of claim 17 wherein the output of the deep learning question-and-answer system includes a dense layer output and a long short-term memory layer output, the dense layer output being indicative of a tentative start location within the reference document for the quality control answer and the long short-term memory layer output being indicative of a tentative end location within the reference document for the quality control answer, and the feedforward neural network further includes:
a fourth dense layer which receives the dense layer output and the output of the first dense layer as inputs, an output of the fourth dense layer being merged with the dense layer output to provide a most likely start location within the reference document for the quality control answer; and
a fifth dense layer which receives the long short-term memory layer output and the output of the first dense layer as inputs, an output of the fifth dense layer being merged with the long short-term memory layer output to provide a most likely end location within the reference document for the quality control answer.

19. The computer system of claim 18 wherein the fourth dense layer uses a first forget gate to adjust first weights of the output of the first dense layer which are used in a first weighted averaging to merge with the dense layer output, and the fifth dense layer uses a second forget gate to adjust second weights of the output of the first dense layer which are used in a second weighted averaging to merge with the long short-term memory layer output.

20. The computer system of claim 15 wherein the reference document is one of a plurality of reference documents in a document collection, and the program instructions further cause the computer system to perform the steps of repeating the applying, the determining and the reporting for each of the reference documents in the document collection, adding each reference document that is reported as being semantically complete to a domain-optimized corpus for the deep learning question-and-answer system, receiving a natural language query from a user, finding a responsive answer to the query using the deep learning question-and-answer system applying the domain-optimized corpus, and providing the responsive answer to the user.

* * * * *